United States Patent [19]

Siviour et al.

[11] 3,892,661

[45] July 1, 1975

[54] REMOVAL OF POLLUTANTS FROM WATER

[75] Inventors: Neil Graham Siviour, East Kew; Grant Marshall Pearson, Elwood; Geoffrey Victor Cullen, North Balwyn, all of Australia

[73] Assignee: University of Melbourne, Australia

[22] Filed: July 14, 1971

[21] Appl. No.: 162,644

[30] Foreign Application Priority Data
July 24, 1970 Australia............................ 1960/70

[52] U.S. Cl. ................................................. 210/40
[51] Int. Cl. ........................................... B01d 15/00
[58] Field of Search ...................... 210/39, 40, 3–8, 210/64, 18

[56] References Cited
UNITED STATES PATENTS

| | | | |
|---|---|---|---|
| 1,532,775 | 5/1925 | Sauer | 210/40 |
| 1,615,091 | 1/1927 | Levy | 210/40 X |
| 1,805,353 | 5/1931 | Berl | 210/40 X |
| 2,008,145 | 7/1935 | Morrell | 210/39 |
| 2,284,593 | 5/1942 | Seidel | 210/40 X |
| 3,401,114 | 9/1968 | Carlton et al. | 210/40 X |
| 3,424,676 | 1/1969 | Johnson et al. | 210/40 |
| 3,442,798 | 5/1969 | Schoeffel et al. | 210/40 |

OTHER PUBLICATIONS

Babbit, H. E. *Sewerage and Sewage Treatment*, N.Y., J. Wiley, 1947 pp. 307–311, 316, 317, 454, 455.

*Primary Examiner*—Charles N. Hart
*Assistant Examiner*—Benoît Castel
*Attorney, Agent, or Firm*—Bacon & Thomas

[57] ABSTRACT

A method for the removal of pollutant organisms from water, which comprises contacting the water with brown coal or brown coal char.

1 Claim, No Drawings

REMOVAL OF POLLUTANTS FROM WATER

The invention relates to a method for the removal of pollutants from water. More specifically the invention is concerned with the use of brown coal and especially brown coal chars as absorbents for pollutant materials, including microbial organisms and non-living pollutant substances.

It is known that certain "activated carbons," usually derived from bituminous coals and activated by special processing techniques, can be used to remove organic pollutants, including microorganisms, from water. Although activated carbons are highly effective in this regard, their high cost mitigates against their general use.

It has also been shown that lignite will remove up to 2 percent of the Chemical Oxygen Demand (C.O.D.) from waste waters. It is the principal object of this invention to provide a method for the removal of pollutant organisms from water which is both effective and cheap when compared with existing methods.

We have now found brown coal and more particularly brown coal chars will remove pollutant organisms from water with a high degree of efficiency. Furthermore, although we have confirmed that brown coal itself is not particularly effective in the removal of other pollutant substances (as measured by C.O.D.), we have found that brown coal chars will effect substantially reduction in the C.O.D. of polluted waters, without resorting to any special procedures for activation of the chars.

"Lignite" and "brown coal" are common names given to coals intermediate between peat and bituminous coal in both geological age and general properties. Brown coal and lignites have been arbitrarily defined as those coals having a calorific value on the moist, ash free basis of less than 10,260 Btu/lb. (See "Encyclopedia of Chemical Technology," Kirk Othmer (Ed.), Interscience, 1967). The American Society for Testing Materials (see A.S.T.M. Standard D338-66 in Part 19, p. 60, Nov. 1971) classifies coal according to rank, (i.e., degree of metamorphism or progressive alteration) and in this classification divides coals into the four classes of Anthracitic Bituminous, Sub-bituminous, Lignitic. It further sub-divides these classes into groups of which there are three for anthracitic, five for bituminous, three for sub-bituminous and two for lignitic. On the above basis, lignitic coals have a calorific value up to 8,300 BTu/lb. The terms "lignite" and "brown coal" are not universally used in the same sense. In the A.S.T.M. classification the entire category is designated as "lignitic," the consolidated ones being lignites and the unconsolidated ones being brown coal. This usage is followed in some other countries but in Germany and many other European countries, and in Australia "brown coal" is the generic term for the whole class, lignite signifying the firmer, fibrous, woody variety. In this specification, the term "brown coal" will be used in the last-mentioned generic sense, except where the context requires a narrower interpretation, i.e. where specific samples of coals are being referred to, and will refer to material falling within the A.S.T.M. classification of "lignitic" coals.

Chars may be produced from brown coals by heating at any temperature between about 200° and about 1200°C; even higher temperatures may sometimes be used. Brown coal from Yallourn, Victoria, Australia, which has been used in most of our studies, has been reported to have a net calorific value of 2920 Btu/lb. when containing 66 percent moisture, 9,000 Btu/lb. when containing 15 percent moisture. Char derived by heating this brown coal at 850°C has been reported to have a net calorific value of 13,700 Btu/lb. One method for producing char consists in heating the brown coal from 100° to 200°C. over 8–10 hrs, then to 600° for 7–8 hrs., and 850°C for a further 1–2 hrs. (See R. S. Higgins, G. L. Kennedy & D. G. Evans, "The Development of Brown Coal Char as a New Metallurgical Fuel" Proc. Aus. I.M.M. Vol. 195 September 1960.)

According to one aspect of the present invention, there is provided a method for the removal of pollutant organisms from water, which comprises contacting the water with brown coal or brown coal char (both as hereinbefore defined).

In another aspect, the invention provides a method for the removal of pollutant organisms and/or other pollutant substances from water, which comprises contacting the water with a brown coal char (as hereinbefore defined).

The solid/liquid ratio required for the method will depend generally on the level and type of pollution initially present in the water, the desired degree of pollution removal, and the time of contact, as well as the actual absorbent selected, i.e. whether brown coal or char. Under ideal conditions, using brown coal char at a solid/liquid ratio of 1:10 and contact time of 2 hours up to 99.99 percent of coliform organisms can be removed from polluted water. Over the same 2 hour period, brown coal char at the same solid/liquid ratio will reduce the C.O.D. of the same polluted water from 42 to 12 ppm. These figures, of course are merely illustrative and are not to be taken as limiting the invention. Generally, however, solid/liquid ratios of 1:10 to 1:500 are considered most useful. The effectiveness of the treatment in the removal of pollutant organisms is generally proportional to the relative amounts of char and water within this range of solid/liquid ratios. Removal is equally effective for contact times of 5 minutes to 2 hours.

The manner of achieving contact between the water and adsorbent does not form a part of this invention but many suitable techniques are available from the arts concerned with water treatment and general materials handling. Among the many possibilities there may be mentioned the use of mixer-settlers; fixed, recoverable or replaceable beds such as filter-beds or columns; and towed or moored rafts or booms containing or comprising the absorbent, which can be situated in streams, rivers or aqueducts.

One important advantage accruing from the use of brown coal or brown coal char as pollutant absorbers is the comparatively low cost of these materials compared with other absorbents. In Australia conventional activated carbons cost about 35 to 80 cents/lb., whereas bed moist brown coal costs about 0.05 cents/lb., and the estimated costs of dried brown coal and brown coal char are about 0.2 and 2 cents/lb., respectively.

It will be appreciated also that the brown coal or char after use can be readily disposed of by burning. Furtheremore, if desired brown coal chars used as absorbents can be regenerated for use by heating, e.g. by a recharring procedure which may be simply a repetition of the original charring process. It will be obvious that some char could be burnt to provide heat for the re-charring process.

The basis and practice of the invention are illustrated by the following examples.

The first two examples show the results of preliminary studies to determine the effectiveness of brown coal and its char for removing a general range of pollutant organisms from water.

In the subsequent examples, in which only brown coal char was used, the effects are shown of process variables, the adsorption capacity of the char, and methods of re-generation of the char for re-use.

It should be understood that the method of counting organisms involves some inherent error, especially at high count levels at which, e.g. a count of 900,000 cannot be distinguished with certainty from 500,000 or 1.6 million. However, where trends are apparent these limitations can be substantially removed.

BROWN COAL

This was obtained from Yallourn, Victoria, Australia and dried at approximately 120°C to about 3 percent moisture content.

BROWN COAL CHAR

This was prepared from the above described brown coal by a method based on that described by Higgins et al. (op. cit.). K. McG. Bowling in "Coal Based Filter Aids for Industrial Application," Proc. Aust. Inst. Min. Met. No. 233, March 1970, p.33–9, describes methods of charring various coals, including brown coal, to obtain specific surface areas of about 700 m²/g without special activation, compared with 700–1500 m²/g for commercial activated carbons.

WATER SAMPLES

Initially water samples were taken from the Yarra River in Victoria, Australia, and although the degree of pollution was found to be high for such a large stream the pollution level was found to decrease considerably after rains, thus leading to difficulty in comparing results of successive experiments. For this reason most of the subsequent water samples were taken from an open drain in the Croydon area of Victoria, in which the pollution level was more consistent, and was much higher.

TREATMENT METHOD

In the first two examples both brown coal and brown coal char were used as the adsorbent, but subsequently only the char was used. In all cases the material was crushed to −14 Tyler mesh, and in some cases the fines were removed by washing.

In the experiments the adsorbents were added to the water in plastic containers and shaken for the specified times, after which the adsorbent was removed by filtration and the resulting water together with samples of the untreated water were submitted for organism counting. Specific treatment variables are shown in the results of the experiments.

In the first two examples the effect of the treatment was evaluated in terms of several measures of pollution, but in subsequent experiments the evaluation was limited to determination of presumptive coliform and confirmed faecal coliform, the latter being the *Eschericha Coli* (*E.Coli*) generally used as an indicator of sewage pollution.

EXAMPLE 1

A sample of water from the Yarra River, about 100 yards east of Princes Bridge, Melbourne, Victoria, was collected during the late summer of 1970 when it was expected that the pollution level would be high. Separate portions of the sample were treated for 2 hours with brown coal and brown coal char, the solid to liquid ratio (weight/weight) being 1:10. Table 1 shows that at least 99.4 percent and 99.7 percent of the organisms were removed by the coal and char, respectively, and Table 1A shows that the C.O.D. of 42 p.p.m. was reduced to 37 p.p.m. and 12 p.p.m.

Table 1

Results of Experiments on Adsorption of Pollutant Organisms from Yarra River Water

| | (A) | (B) | | (C) | |
|---|---|---|---|---|---|
| Type of pollution count | Organisms per 100 mls | Organisms per 100 mls | Organisms Removed (%) | Organisms per 100 mls | Organisms Removed (%) |
| E. Coli Type 1[1] | 25,000 | 130 | 99.5 | 5 | 99.98 |
| Confirmed Coliform[2] | 160,000 | 900 | 99.4 | 13 | 99.99 |
| 37° plate test[3] | 338,000 | 1500 | 99.5 | 1000 | 99.70 |
| 22° plate test[4] | 2,880,000 | 5100 | 99.8 | 3000 | 99.90 |

Notes
(A) Untreated water
(B) Water after contact with dried brown coal for 2 hours; solid/liquid ratio 1:10.
(C) Water after contact with brown coal char for 2 hours; solid/liquid ratio 1:10.
[1]*Eschericha Coli* Type 1 is an organism used as a standard indicator of sewage pollution.
[2]Confirmed Coliform refers to the general coliform group of organisms.
[3]The 37° plate test is conducted after holding the plate at 37°C for 24 hrs. and is used as an indicator of the count of organisms originating from warm blooded animals and humans.
[4]The 22° plate test is conducted after holding the plate at 22°C for 3 days, and is used as an indicator of the count of organisms originating from general soils and the environment.

Table 1A

Results of Experiment on Adsorption of
Pollutant Organisms and Oxygen Consuming
Materials from Yarra River Water.

| Type of pollution test | (A) | (B) | (C) |
|---|---|---|---|
| Chemical Oxygen Demand. (C.O.D.) (ppm) | 42 | 37 | 12 |

(A) Untreated water
(B) Water after contact with dried brown coal for 2 hrs; solid/liquid ratio 1:10
(C) Water after contact with brown coal char for 2 hrs; solid/liquid ratio 1:10

EXAMPLE 2

This experiment was done to determine the effectiveness of the treatment in a shorter time, i.e. 12 minutes.

At the time of this experiment heavy rains had diluted the pollution in the Yarra River, so to obtain a pollution level comparable with the earlier experiment, raw sewage was added to the water. The results of the experiment are given in Table II, and it will be seen that even in the much shorter time at least 92.9 percent of the organisms were removed by the brown coal, and at least 97.7 percent by the char.

Table II

Results of Experiment on Adsorption of
Pollutant Organisms from Yarra River Water
Containing Added Raw Sewage Effluent.

| | (D) | (E) | | (F) | |
|---|---|---|---|---|---|
| Type of pollution count | Organisms per 100 mls | Organisms per 100 mls | Organisms Removed (%) | Organisms per 100 mls | Organisms Removed (%) |
| Eschericha Coli Type 1[1] | 35,000 | 2,500 | 92.9 | 800 | 97.7 |
| Confirmed Coliform[2] | 900,000 | 55,000 | 93.9 | 3,500 | 99.6 |
| 37° plate test[3] | 3,800,000 | 64,000 | 98.3 | 33,000 | 99.1 |
| 22° plate test[4] | 19,600,000 | 129,000 | 99.3 | 266,000 | 98.6 |

[1], [2], [3] & [4] see footnotes in Table 1.
(D) Untreated water containing added sewage effluent
(E) Water after contact with dried brown coal for 12 mins; solid/liquid ratio 1:10
(F) Water after contact with brown coal char for 12 mins; solid/liquid ratio 1:10

EXAMPLE 3

This experiment was done to determine the effect of contact time. A lower solid to liquid ratio was used than in Example 1. Table III shows that 99.6 percent of the faecal coliform was removed in 5 minutes, and that the results for up to 50 minutes were substantially the same.

Table III

Adsorption of Coliform Organisms in Croydon
Drain Water by Brown Coal Char.
Effect of Period of Contact.

| | | Organisms Removed (%) | |
|---|---|---|---|
| Solid/liquid ratio | Contact time (min) | Presumptive Coliform | Faecal Coliform |
| Original water[5] | — | — | — |
| 1:25 | 5 | >99.4 | 99.6 |
| 1:25 | 10 | >98.1 | 99.5 |
| 1:25 | 20 | >98.7 | 99.5 |
| 1:25 | 50 | >99.7 | 99.4 |

[5] Presumptive Coliform, >1,800,000; Faecal Coliform, 1,000,000 organisms/100 mls.

EXAMPLE 4

The results of this experiment in Table IV show that the removal of organisms is affected by lowering the solid to liquid ratio, but even at 1:100 the removal is 82 percent for faecal coliform in 20 minutes contact.

Table IV

Adsorption of Coliform Organisms in
Croydon Drain Water by Brown Coal Char.
Effect of Solid to Liquid Ratio.

| | | Organisms Removed (%) | |
|---|---|---|---|
| Solid/liquid ratio | Period of Contact time (min) | Presumptive Coliform | Faecal Coliform |
| Original water[5] | | — | — |
| 1:10 | 20 | >99.9 | 99.7 |
| 1:25 | 20 | >99.5 | 99 |
| 1:50 | 20 | >98 | 97 |
| 1:100 | 20 | >50 | 82 |
| 1:250 | 20 | >10 | 10 |
| 1:500 | 20 | — | — |

[5] Presumptive Coliform, >1,800,000; Faecal Coliform, 1,000,000 organisms/100 mls.

EXAMPLE 5

This experiment was done to determine the total capacity of a given sample of char for adsorbing organisms. It was recognized that in practice (in a fixed filter type bed, for example) some of the fine char would be carried away by the water stream; so one test done on the char as-crushed and then six successive tests were done with a further sample from which the fines had been removed by water washing. Finally, the char after the sixth contact was washed with unpolluted water to determine whether the organisms were killed by contact with the char. From Table V it will be seen that the char containing the fine char is probably more effective than the washed char, and that the ability of the washed char to adsorb further organisms steadily decreases with each successive contact, except between the first and second contact which is probably indicative of experimental error in organism counting. It will also be seen that some organisms have not been killed and can be removed by washing.

Table V

Adsorption of Coliform Organisms from
Croydon Drain Water by Brown Coal Char.
Effect of Multiple contacts.
(20 minute contact. Solid to liquid ratio 1:25)

| | Organisms Removed (%) | |
|---|---|---|
| Test | Presumptive Coliform | Faecal Coliform |
| Original water[(5)] | | |
| Single contact of char* | >95.5 | 98 |
| First contact** | >11 | 89 |
| Second contact | — | 96 |
| Third contact | — | 89 |
| Fourth contact | — | 78 |
| Fifth contact | — | 66 |
| Sixth contact | — | 44 |
| Char from sixth contact washed | — | |

*Unwashed char as in Tables III & IV.
**Char washed to remove fines. 16 [(5)]Presumptive coliform, >1,800,000; Faecal Coliform, 1,000,000 organisms/100 mls.

EXAMPLE 6

This experiment comprized two series of tests to compare the performance of brown coal char with commercial activated carbon. The results show that brown coal char and activated carbon are reasonably similar in performance for the first contacts, but in successive contacts the char is probably only about half as effective.

Table VI

Adsorption of Coliform Organisms in
Croydon Drain Water by Brown Coal Char
and Active Carbon.
Effect of Multiple Contacts.
(20 minute contact. Solid to liquid ratio 1:20)

| Test | Organisms Removed (%) Faecal Coliform |
|---|---|
| First Series | |
| Original Water[(5)] | |
| 1st contact with char | 98 |
| 3rd " | 39 |
| 5th " | 39 |
| 7th " | 61 |
| 1st contact with active carbon | 95 |
| 3rd " | 81 |
| 5th " | 72 |
| Second Series | |
| Original water[(5)] | |
| 1st contact with char | 78 |
| 2nd " | 65 |
| 3rd " | — |
| 4th " | — |
| 5th " | 44 |
| 1st contact with active carbon | 65 |
| 2nd " | — |
| 3rd " | 44 |
| 5th " | 44 |

[(5)]Presumptive coliform, >1,800,000; Faecal Coliform, 1,000,000 organisms/100 mls

EXAMPLE 7

In a series of experiments to determine the suitability of various methods of regenerating the char for re-use, the loaded adsorbents from some of the test series described in Experiment 6 were treated in various ways. From Table VII it will be seen that burning some of the char seems to be the most effective method of regeneration, that heating at 125°C is reasonably effective and boiling in water gives negligible regeneration. It will also be seen that although the performance of the regenerated char is generally comparable in the first contacts, with the original char, the performance of the regenerated char is generally not as good in subsequent contacts.

Table VII

Adsorption of Coliform Organisms by
Regenerated Brown Coal Char. Effect
of Multiple Contacts in Water from
Croydon Drain.
(20 minute contacts, solid to liquid ratio 1:20)

| Test Series of Example 6 in which char loaded | Regeneration method | Contact number | Faecal Coliform Organisms Removed(%) |
|---|---|---|---|
| | | None* | |
| 1 | Heated at 125°C for 17 hrs. | 1 | 78 |
| | | 3 | 84 |
| 1 | Burnt to 12% wt. loss | 1 | 84 |
| | | 3 | 44 |
| | | 5 | — |
| | | None* | |
| 2 | Heated at 125°C for 17 hrs. | 1 | 51 |
| | | 3 | 51 |
| | | 5 | — |
| 2 | Burnt to 11% wt. loss | 1 | 99 |
| | | 3 | 77 |
| | | 5 | 21 |
| | | None* | |
| 2 | Boiled in water for 15 mins. | 1 | + |
| | Heated at 125° for 17 hrs. | 3 | + |
| | | 5 | + |

*Original water.
+Count higher than in original water.

We claim:

1. A method for the removal of pollutant microorganisms from water, which comprises contacting the water with a brown coal char, separating the char from the water after contact, wherein the brown coal char is present in a weight ratio of brown coal char to water of from about 1:10 to 1:500 and the brown coal char is contacted with the water for at least about 5 minutes.

* * * * *